United States Patent [19]
Corfe et al.

[11] Patent Number: 5,043,553
[45] Date of Patent: Aug. 27, 1991

[54] METHOD AND APPARATUS FOR DRILLING A SHAPED HOLE IN A WORKPIECE

[75] Inventors: Arthur G. Corfe; David Stroud, both of Bristol, England; Jonathan P. W. Towill, Cardiff, Wales

[73] Assignee: Rolls-Royce plc, England

[21] Appl. No.: 417,083

[22] Filed: Oct. 4, 1989

[30] Foreign Application Priority Data

Oct. 12, 1988 [GB] United Kingdom ............... 8823874

[51] Int. Cl.$^5$ ............................................. B23K 26/00
[52] U.S. Cl. ............................ 219/121.7; 219/121.67; 219/121.74; 219/121.78; 219/121.79
[58] Field of Search ................ 219/121.67, 121.72, 219/121.7, 121.71, 121.74, 121.75, 121.77, 121.78, 121.79

[56] References Cited

U.S. PATENT DOCUMENTS

| | | | |
|---|---|---|---|
| 4,063,064 | 12/1977 | Saunders et al. | 219/121.7 |
| 4,358,659 | 11/1982 | Spohnheimer | 219/121.72 X |
| 4,461,947 | 7/1984 | Ward | 219/121.78 X |
| 4,694,139 | 9/1987 | Roder | 219/121.67 X |

FOREIGN PATENT DOCUMENTS

| | | | |
|---|---|---|---|
| 0054839 | 12/1985 | Japan | 219/121.72 |
| 0052786 | 3/1988 | Japan | 219/121.74 |
| 1229876 | 4/1971 | United Kingdom . | |
| 1262613 | 2/1972 | United Kingdom . | |
| 1543216 | 3/1979 | United Kingdom . | |

*Primary Examiner*—C. L. Albritton
*Attorney, Agent, or Firm*—Oliff & Berridge

[57] ABSTRACT

An apparatus for drilling a shaped hole in a workpiece by means of a laser beam emanating from a laser source, includes (a) means for directing the beam onto the workpiece, (b) means for controlling the angle of the beam striking the workpiece relative to the axis of the hole, and, (c) means for controlling the distance between the intersection of the beam with the surface of the workpiece and the axis of the hole, so that the combination of the means for controlling the angle and the means for controlling the distance enables a shaped hole to be drilled in the workpiece by the laser beam. The apparatus also includes means for rotating the direction of the beam about the axis of the hole so as to describe at least part of the curved surface of a one that has its vertex on or within the body of the workpiece.

8 Claims, 4 Drawing Sheets

METHOD AND APPARATUS FOR DRILLING A SHAPED HOLE IN A WORKPIECE

This invention relates to a method and apparatus for drilling a shaped hole in a workpiece, in particular a film-cooling hole in a blade or nozzle guide vane of a gas turbine engine.

The thermodynamic efficiency of a gas turbine engine increases with increased running temperature of the turbine. The known technique of film-cooling permits a turbine to be run at a temperature (and hence at a high thermodynamic efficiency in excess of the maximum permissible operating temperature of the blades and nozzle guide vanes.

The technique of film-cooling works as follows. The turbine blade or nozzle guide vane is hollow in section and is provided with a large number of holes drilled through at the leading edge and at various positions along the chord. Cool air is forced into the root of the blade or nozzle guide vane and bleeds out through the cooling holes to form a thin film of cool air over the surface of the blade or nozzle guide. This thin film of cool air enables the surface of the blade or vane to remain at a temperature substantially below that of the ambient turbine gases. A gas turbine may therefore run at a temperature about 200° above the melting temperature of the blades or vanes within the engine.

There are three principal method of drilling cylindrical film-cooling holes, as discussed below.

Electron discharge machining (EDM) uses an electrode wit a low-voltage, high current power source to cut through the workpiece by spark erosion. Holes of 0.2 mm. diameter and larger can be produced, but the rate of cutting can be slow and tooling costs are very high.

Capillary drilling uses an electrode surrounded by a concentric glass capillary tube. An electrolyte is forced down the annular gap between the electrode and the capillary tube so that when a voltage is applied across the electrode and workpiece, material is removed, from the workpiece. Again, holes of 0.2 mm. diameter and larger can be produced, but the rate of cutting can be slow.

Since both EDM and capillary drilling involve electrical conduction through the workpiece it is only possible to drill metallic materials by means of these processes.

Laser machining uses a laser machine tool to focus a beam of high energy coherent radiation (laser light) at the workpiece surface, hence causing material to be vaporized and expelled. Through holes can be drilled either by focusing a stationary laser beam at a spot on the workpiece, or by trepanning. In trepanning, a continuous beam of laser light is passed through an optical system which causes the beam to describe a cylinder, typically in about one second. Hence the beam cuts out the hole around its edge rather than drilling through in one go. Holes with a diameter of 0.25 mm. and larger can be drilled with the laser at much higher speeds than can be attained with the two previously described methods. Non-metallic materials may also be readily drilled with a laser beam.

The cylindrical cooling holes described above have disadvantages: it is difficult to arrange the cooling holes to provide an adequate flow of air without a risk of the film separating from the surface of other turbine blade, and some cooling holes tend to become blocked. Both these effects reduce the efficiency of the cooling.

The disadvantages of cylindrical cooling holes may be overcome by providing a cooling hole that has a shaped exit. In particular, this type of hole has an exit area greater than the inlet area in order to diffuse the cooling air smoothly into an effective boundary layer.

FIG. 1 is a section through a portion of a turbine blade 10 showing, in section, a cooling hole that has a cylindrical inlet 11 and a conical (fan-shaped in section) exit 12. The fan-shaped exit 12 enables the cooling air to diffuse smoothly into an effective boundary layer. The inlet 11 of the hole determines the flow rate through the hole. Since there is a tolerance on the wall thickness of the turbine blade it not possible to define accurately the inlet area of a hole that is entirely conical from one side of the blade to the other.

Although the exit portion of the cooling hole may have any shape that has a larger exit area than the inlet area it is usually a cone or combination of a number of cones. Two suitable hole shapes are shown in perspective view in FIGS. 2 and 3. The hole of FIG. 2 has an exit 12 which is a flattened cone (a "2-D"hole) and the hole of FIG. 3 has an exit 12 which is a regular cone (a "3-D"hole).

Hitherto, the only techniques available for producing shaped exit holes as described herein are those based on EDM.

In one EDM technique a standard cylindrical electrode is oscillated laterally during drilling, at am amplitude which decreases towards the bottom of the hole. Clearly, this is a slow process.

In another technique an electrode is used which is nominally the same shape as that required for the hole. The electrode is moved linearly into the workpiece during drilling. Again, this is a slow process and each shaped electrode must be discarded after it has been used to drill a hole. A further disadvantage of EDM techniques is that they cannot be used to drill ceramic materials per se.

SUMMARY OF THE INVENTION

According to a first aspect of the present invention there is provided a method of drilling a shaped hole in a workpiece by means of a laser beam, comprising, (a) directing the beam onto the workpiece, (b) controlling the angle of the beam striking the workpiece relative to the axis of the hole, and (c) controlling the distance between the intersection of the beam with the surface of the workpiece and the axis of the hole.

Preferably, the method further comprises rotating the direction of the beam about the axis of the hole so as to describe at least part of the curved surface of a cone that has its vertex within the body of the workpiece.

According to a second aspect of the present invention there is provided an apparatus for drilling a shaped hole in a workpiece by means of a laser beam emanating from a laser source, comprising, (a) means for directing the beam onto the workpiece, (b) means for controlling the angle of the beam striking the workpiece relative to the axis of the hole, and, (c) means for controlling the distance between the intersection of the beam with the surface of the workpiece and the axis of the hole, whereby the combination of the means for controlling the angle and the means for controlling the distance enables a shaped hole to be drilled in the workpiece by the laser beam.

Preferably, the apparatus further comprises means for rotating the direction of the beam about the axis of the hole so as to describe at least part of the curved surface of a cone that has its vertex within the body of the workpiece.

BRIEF DESCRIPTION OF THE DRAWINGS

The invention will now be described by way of example with reference to FIGS. 4 to 9 of the accompanying drawings, in which.

DETAIL DESCRIPTION OF THE PREFERRED EMBODIMENTS

Figure 4:
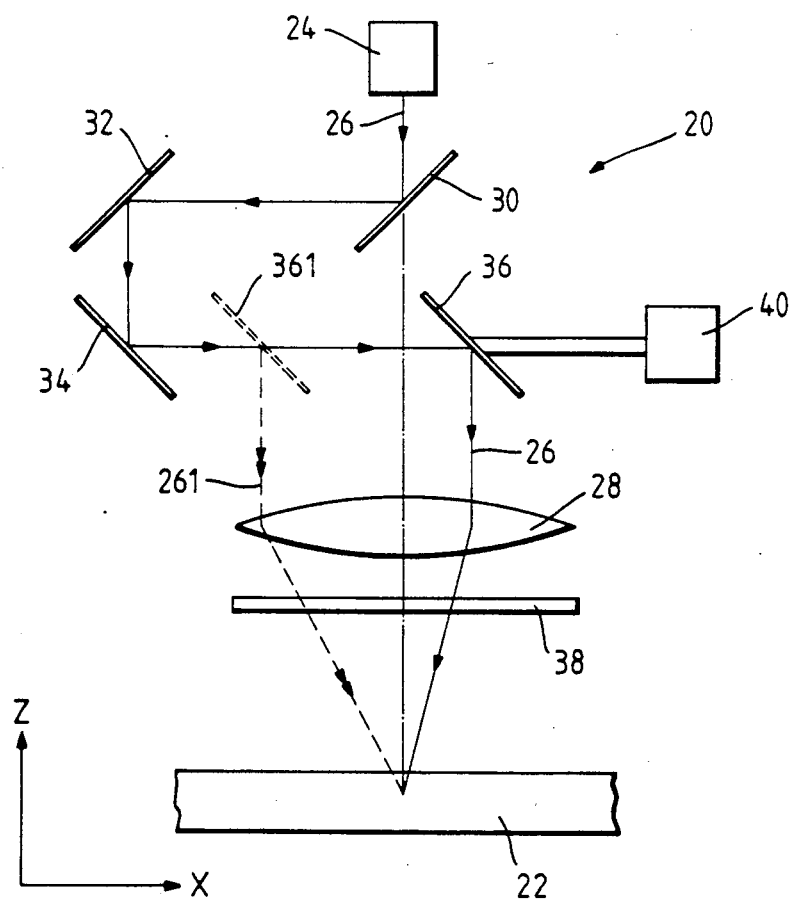
FIG. 4 is a schematic diagram of a first embodiment of an apparatus including a lens, for drilling a shaped hole in a workpiece by means of a laser.
Figure 5:
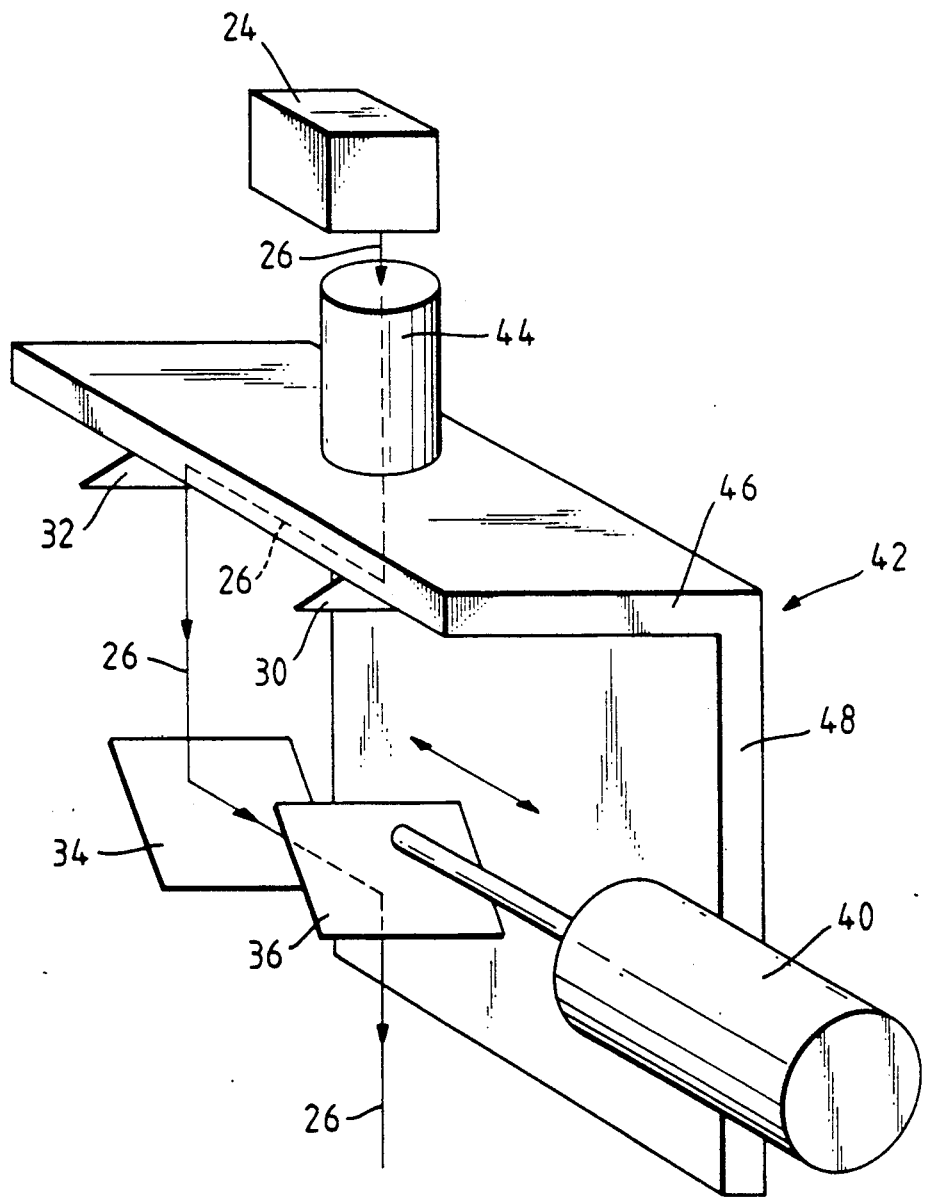
FIG. 5 is a diagrammatic perspective layout of components of the apparatus of FIG. 4, excluding the lens and workpiece.

Referring to the first embodiment of the invention in FIGS. 4 and 5 there is shown an apparatus 20 for drilling a shaped hole in a workpiece 22. The apparatus 20 comprises a source 24 to generate a beam 26 of high-energy coherent radiation (laser light), a convex lens 28 arranged to direct the beam onto the workpiece, the optical axis of the lens being in alignment with the beam as it leaves the source, a set of mirrors 30, 32, 34, 36 in the light path of the beam between the source and the lens arranged to direct the beam onto the lens off-centre from and parallel to the optical axis. A protective cover slide 38 is located between the lens 28 and the workpiece 22 to protect the lens from vapour or burning material given off by the workpiece when it is being drilled by the laser. The distance between the lens 28 and the workpiece 22 is controlled by motor means (not shown). The workpiece 22 is positioned laterally so that the axis of the hole to be drilled is substantialy in alignment with the laser beam 26 as it leaves the source 24.

Mirrors 30, 32 and 34 are fixed relative to each other and are arranged so as to turn the laser beam 26 through an angle of 90° relative to the optical axis of the lens 28, and to direct the beam towards the optical axis so as to strike mirror 36. Mirror 36 is arranged so to be movable to and from mirror 34 by motor means 40 in a direction orthogonal to the optical axis of the lens 28, and is angled relative to the optical axis of the lens so as to direct the beam 26 onto the lens in a direction parallel to the optical axis. On passing through the lens 28 the beam 26 is directed onto the workpiece 22, where the energy of the laser beam burns away or otherwise vaporizes the material of the workpiece.

A second position of mirror 36 along the direction orthogonal to the optical axis of the lens 28 is indicated by dashed lines 361, and the path of the laser beam from mirror position 361 through the lens onto the workpiece 22 is indicated by dashed lines 261. This second position of the mirror 36 is reached by actuating motor 40 so as to move the mirror 36 in a plane orthogonal to the optical axis of the lens. In the second position 361 the mirror directs the laser beam onto the lens at a different position (but still parallel to the optical axis of the lens) so that the beam is deflected by the lens and strikes the workpiece at a different angle and distance from the axis of the hole. The second position 361 is one of an infinite number of positions determined by control of the motor 40.

As shown in FIG. 5, there is provided an aluminium base plate 42 of an inverted "L" section which carries on its top horizontal surface 46 bearings 44. The bearings 44 are coaxial with the beam 26 emanating from the laser source 24 and are clamped to the laser source by means of brackets (not shown). On the inside vertical face 48 of the "L" are attached the mirrors 30-36 and the motor 40 controlling lateral movement of mirror 36. The base plate 42 is ale to rotate about the laser beam 26 emanating from the source 24 by means of the bearings 44. The rotation is controlled by a motor (not shown).

Mirror 36 is thus able to orbit about the axis of the hole to be drilled in a controlled fashion and at a distance from the axis determined by motor 40. The laser beam 26 is consequently able to rotate about the axis of the hole, describing at least part of the curved surface of an imaginary cone the apex of which lies on or within the surface of the workpiece 22, and to drill out a conical hole of predetermined angle in the workpiece.

Hence, by controlling (a) the lateral offset of mirror 36 from the optical axis of the lens, and therefore the angle at which the laser beam strikes the workpiece, (b) the distance between the lens and the workpiece, and therefore the depth of the hole to be drilled. and (c) the angle through which mirror 36 orbits about the axis of the hole, it is possible to drill in the workpiece a conical hole of controllable angle and size. By causing the mirror 36 to orbit through 360° a complete trepanning motion can be achieved.

The distance between the lens 28 and the workpiece 22 may be varied by moving either the lens or the workpiece along their mutual axis.

If the mirror 36 is not orbited about the axis of the hole a "2-D" conical hole may be provided if required.

Figure 1:
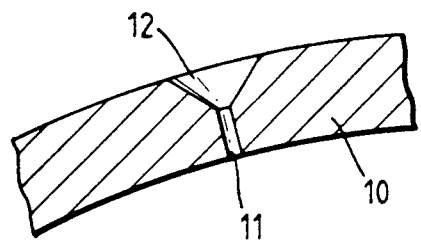
Figure 2:
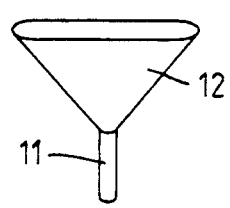
Figure 3:
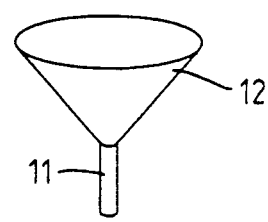
Figure 9:
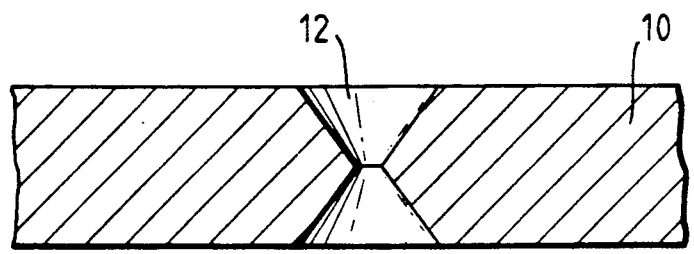
FIG. 9 shows a "double-cone" hole drilled in a workpiece by means of the invention.

After a conical hole has been drilled it may be drilled through at its apex to provide a hole as shown in FIG. 2 or 3. Further control of the laser beam by the mirrors 30-36 and the motors may provide a hole having an exit cone opposed to the entrance cone, as shown in FIG. 9.

In a variant embodiment (not illustrated) of the invention of FIGS. 4 and 5 it may be preferred to move the lens by means of an X-Y table laterally relative to the axis of the hole, while keeping mirror 36 fixed relative to mirrors 30-34 and directly in alignment with the beam emanating from the source. It is also possible in this variant to dispense with the mirrors and to direct the beam from the source directly onto the lens. Thus cylindrical trepanning can be achieved.

It will be understood that throughout the description of this invention the term "mirror" includes not only a reflective surface but a prism designed to act as a reflective surface. Also, "convex lens" includes not only a double convex shape but also a plano-convex shape, and other lens shapes, or combinations of lens shapes, which have an overall convex effect. The lens may even be anamorphic or may consist of a finite number of prismatic elements. The lens may be designed to minimize astigmatism and spherical aberrations.

Figure 6:
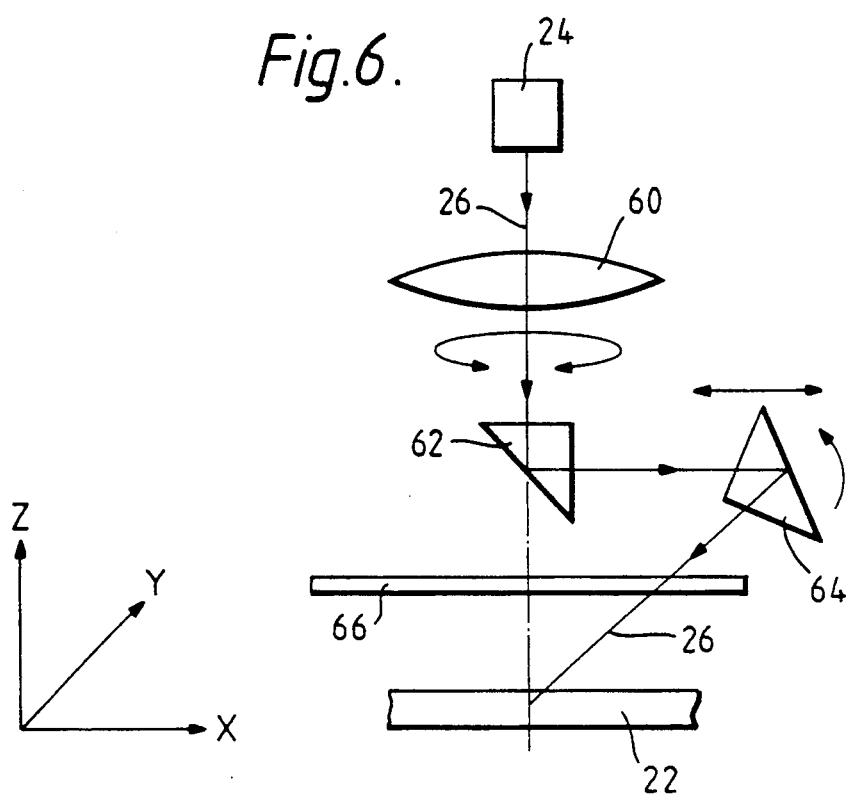
FIGS. 6 to 8 are schematic diagrams of second, third and fourth embodiments, respectively, of apparatus for driling a shaped hole in a workpiece by means of a laser.

The embodiment of FIG. 6 shows an arrangement whereby the laser beam 26 passes through a convex lens 60 onto a fixed first prism 62 on the optical axis of the lens. The prism 62 reflects the beam onto a second prism 64 located laterally of the optical axis (the Z-axis) of the lens. The second prism 64 is arranged to translate along the X-axis (towards the optical axis) to alter cone angle), whilst both prisms 62, 64 are coupled to rotate about the Z-axis to produce a trepanning motion. The beam then passes through a protective cover slide 66 onto the workpiece 22.

Figure 7:
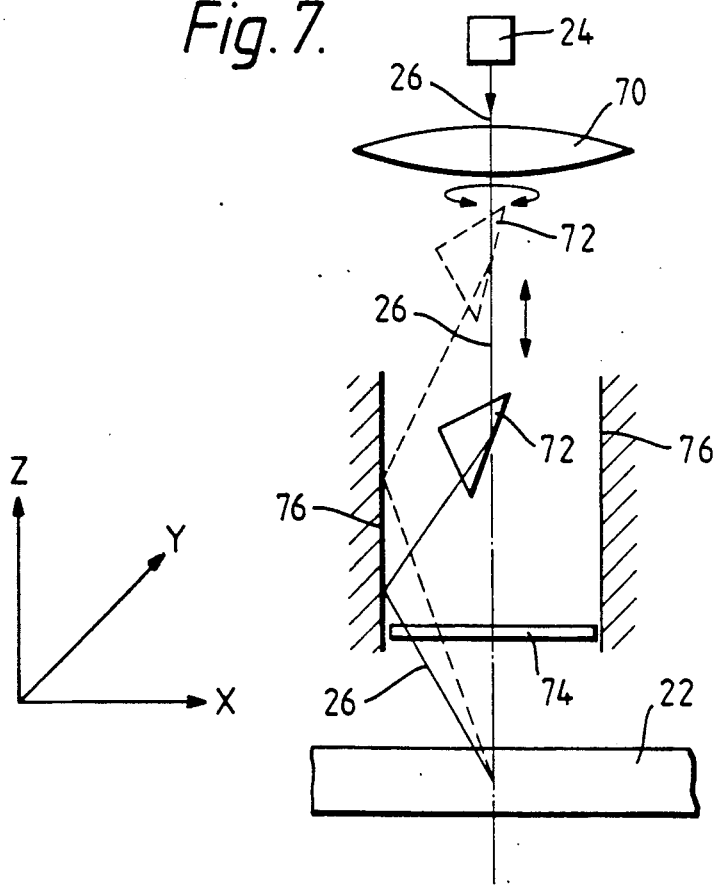

The embodiment of FIG. 7 shows an arrangement of a convex lens 70, a hollow cylindrical mirror 76 and a prism 72. The cylindrical mirror 76 has its reflective surface on the inside and is coaxial with the optical axis (Z-axis) of the lens 70 which is positioned between the laser source 24 and the mirror. The prism 72 is located on the optical axis of the cylindrical mirror 76 (i.e. on the Z-axis). In operation the laser beam 26 emanating from the laser source 24 passes through the lens 70 along the Z-axis of the cylindrical mirror 76 and onto the prism 72. The prism 72 directs the beam 26 onto the reflective inside surface of the cylindrical mirror 76 from where it is reflected at an angle to the Z-axis through a protective cover slide 74 onto the workpiece 22. The prism 72 is able to rotate about the Z-axis to provide a trepanning motion, about a Y-axis to vary the approach angle, and to translate along the Z-axis to alter the cone depth.

Figure 8:
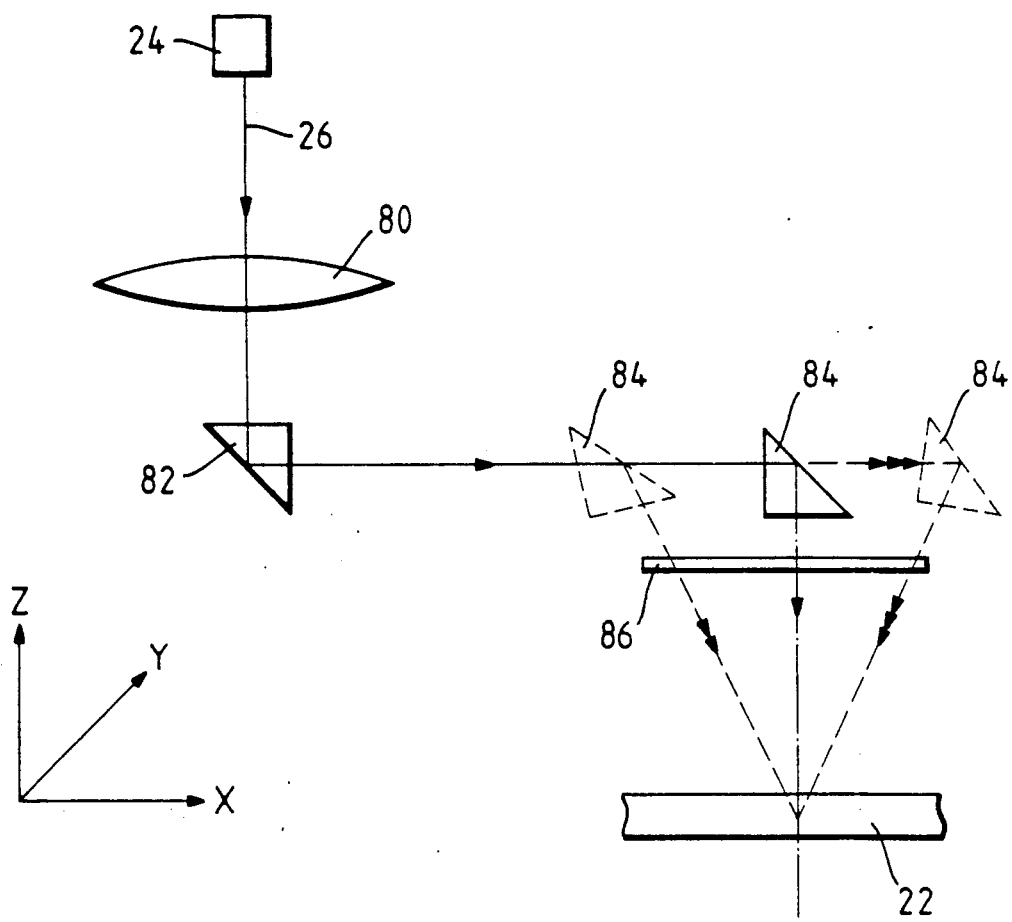

The embodiment of FIG. 8 shows an arrangement whereby the laser beam 26 passes through a convex lens 80 onto a prism 82 which deflects the beam through 90° to a second prism 84. The second prism 84 is able to translate along the X-axis and to rotate a limited amount (about 20°) about its own X,Y-axes. Prisms 82, 84 are coupled to rotate a limited amount (about 20°) about the Z-axis of the lens. The beam leaves prism 84 to pass through a cover slide 86 onto the workpiece 22. The axis of the hole and the lens 80 are parallel but not coincident.

Although the embodiments of FIGS. 6, 7 and 8 may be useful in specific circumstances it will be understood that they have individual disadvantages which make it difficult for them to have the general applicability of the embodiment of FIGS. 4 and 5.

The invention thus enables shaped holes to be drilled to very fine tolerances in metals and refractory materials, as are used in the manufacture of gas turbine components, using a high-energy laser beam, both economically and speedily.

We claim:

1. An apparatus for drilling a shaped hole in a workpiece by means of a laser beam emanating from a laser source, the shape of at least part of the hole being defined by the curved surface of a cone having its vertex on or within the body of the workpiece, the apparatus comprising:

(a) first mirror means for directing the beam onto the workpiece,
 (b) means for controlling the angle of the beam striking the workpiece relative to the axis of the hole, comprising,
  (i) a convex lens, being also the means for directing the beam onto the workpiece,
  (ii) means directing the beam onto the lens in a direction parallel to the optical axis of the lens, and
  (iii) means for effecting lateral displacement between the point where the beam strikes the lens and the axis of the lens in a plane orthogonal to the optical axis of the lens so that the beam is thereby directed onto the workpiece at an angle determined by said lateral displacement,
 (c) means for controlling the distance between the intersection of the beam with the surface of the workpiece and the axis of the hole, whereby the combination of the means for controlling the angle and the means for controlling the distance enables a shaped hole to be drilled in the workpiece by the laser beam, and
 (d) means for rotating the direction of the beam about the axis of the hole so as to describe at least part of the curved surface of a cone that has its vertex on or within the body of the workpiece.

2. Apparatus as claimed in claim 1 wherein the laser beam emanating from the source is substantially coaxial with the optical axis of the lens, there being provided second mirror means arranged to provide a light path for the beam from the source to the first mirror means, said second mirror means being fixed relative to the beam emanating from the source.

3. Apparatus as claimed in claim 2 wherein the second mirror means comprises an arrangement of at least one mirror arranged to direct the beam in a direction orthogonal to said optical axis.

4. Apparatus as claimed in claim 3 wherein the arrangement comprises three mirrors fixed relative to each other.

5. Apparatus as claimed in claim 1 wherein the means for effecting relative linear displacement is a motor arranged to move the first mirror means in said plane.

6. Apparatus as claimed in claim 1 wherein the means for effecting relative linear displacement is provided by a motor arranged to move the lens in said plane independently of any movement of the first mirror means.

7. Apparatus as claimed in claim 1 wherein the first mirror means is arranged to orbit under control about the axis of the lens.

8. Apparatus as claimed in claim 7 wherein a motor means is provided to enable the first mirror means to orbit about the axis of the lens.

* * * * *